United States Patent [19]
Katz

[11] Patent Number: 6,088,220
[45] Date of Patent: Jul. 11, 2000

[54] POCKET COMPUTER WITH FULL-SIZE KEYBOARD

[76] Inventor: Michael Katz, #201-609 Stanps Landing, False Creek, Vancouver, B.C., Canada, V5Z 3Z1

[21] Appl. No.: 08/942,778

[22] Filed: Oct. 2, 1997

[51] Int. Cl.[7] .................................. G06F 1/16; H05K 5/03
[52] U.S. Cl. ............................ 361/680; 361/681; 400/82; 345/901; 341/22
[58] Field of Search ...................................... 361/680, 681; 400/82, 492, 682, 489; 364/708.1; 235/146; 345/901; 341/22

[56] References Cited

U.S. PATENT DOCUMENTS

| | | | |
|---|---|---|---|
| 3,940,758 | 2/1976 | Margolin | 340/337 |
| 4,378,553 | 3/1983 | McCall | 340/465 R |
| 4,661,005 | 4/1987 | Lahr | 400/489 |
| 5,128,662 | 7/1992 | Failla | 340/752 |
| 5,187,644 | 2/1993 | Crisan | 361/393 |
| 5,198,991 | 3/1993 | Pollitt | 364/708 |
| 5,267,127 | 11/1993 | Pollitt | 361/680 |
| 5,295,089 | 3/1994 | Ambasz | 364/708.1 |
| 5,424,728 | 6/1995 | Goldstein | 341/22 |
| 5,457,452 | 10/1995 | Skovronski | 341/22 |
| 5,457,453 | 10/1995 | Chiu et al. | 341/22 |
| 5,519,569 | 5/1996 | Sellers | 361/680 |
| 5,596,480 | 1/1997 | Manser et al. | 361/680 |
| 5,646,817 | 7/1997 | Manser et al. | 361/680 |
| 5,687,939 | 11/1997 | Moscovitch | 248/122.1 |
| 5,703,578 | 12/1997 | Allison | 341/22 |
| 5,712,760 | 1/1998 | Coulon et al. | 361/680 |
| 5,768,096 | 7/1998 | Williams et al. | 361/681 |
| 5,847,698 | 12/1998 | Reavey et al. | 345/173 |

FOREIGN PATENT DOCUMENTS

| | | |
|---|---|---|
| 0 605 827 A2 | 7/1994 | European Pat. Off. . |
| 0 671 751 A2 | 9/1995 | European Pat. Off. . |
| 195 02 704 | 8/1996 | Germany . |
| 195 46 786 | 6/1997 | Germany . |
| 196 48 802 | 5/1998 | Germany . |
| 07093069 | 4/1995 | Japan . |
| 2 279 617 | 1/1995 | United Kingdom . |

*Primary Examiner*—Benjamin R. Fuller
*Assistant Examiner*—Jagdish Patel
*Attorney, Agent, or Firm*—Seed and Berry LLP

[57] ABSTRACT

Prior miniaturzed palm-top computers have reduced-size keyboards which are not useful for standard typing. The present invention provides a folding pocket-sized computer, comprising up to a 12" screen, a central processing unit, data storage and input means and a full size computer keyboard. It does this by having the keyboard divided into two halves hingedly connected along a fold line, whereby one of the keys is split along the fold line to permit folding of the keyboard, and by folding the screen and abutting the sections of the screen with no intervening frames.

14 Claims, 10 Drawing Sheets

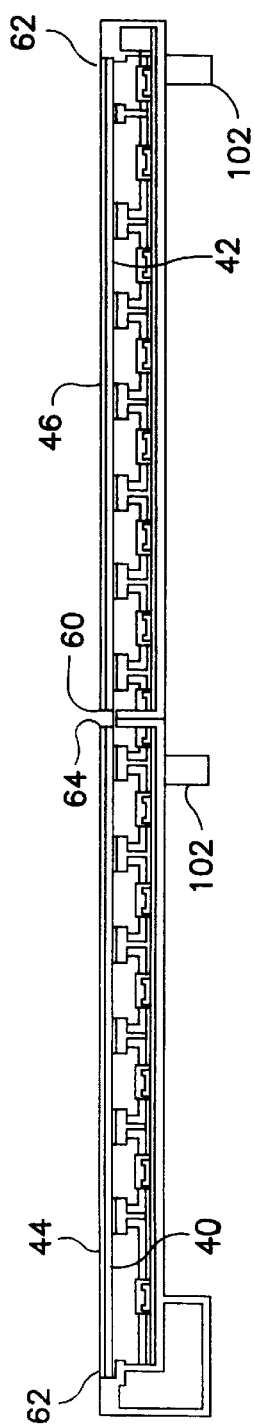
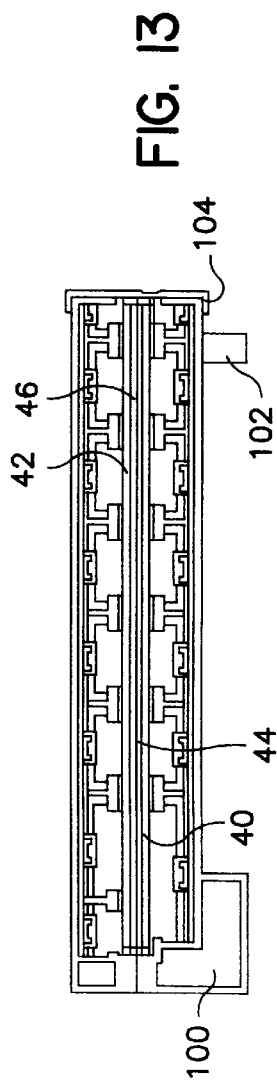
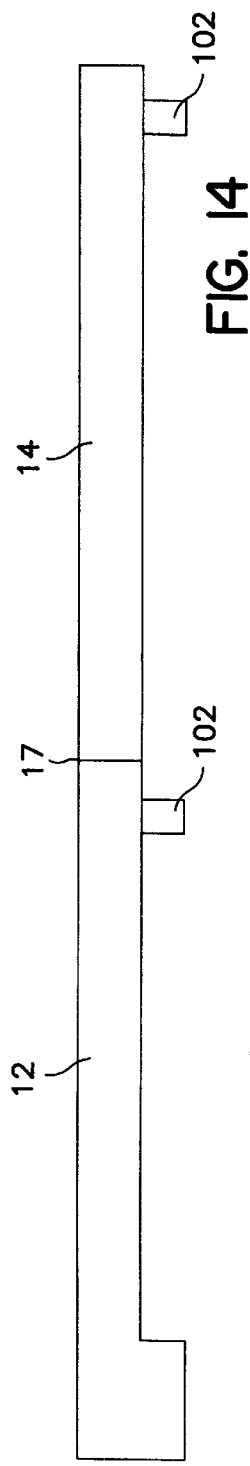
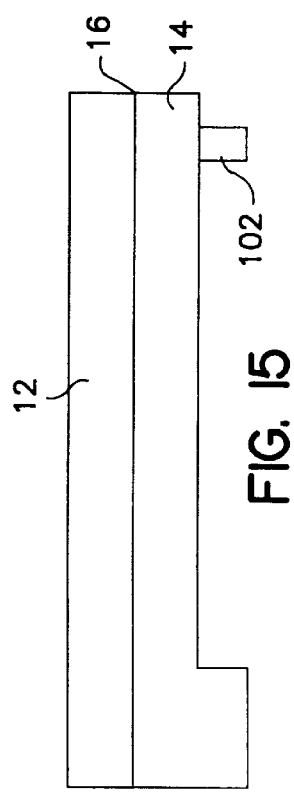
FIG. 12
FIG. 13
FIG. 14
FIG. 15

POCKET COMPUTER WITH FULL-SIZE KEYBOARD

TECHNICAL FIELD

The invention relates to the field of "palm top" or pocket computers and more particularly to a palm top computer having a full-size keyboard and up to a 12" screen.

BACKGROUND ART

For historical reasons, the standard QWERTY keyboard which was developed for mechanical typewriters the most common medium for inputting information to a computer. The size and spacing of the keys on such a keyboard was determined by the size of the human hand and fingers. For each key to be strongly struck a travel motion of at least 3/16" was required. The letter or symbol associated with a given key was determined by the frequency of occurrence of the different letters in the English language. Personal computers continue to use electronic equivalents of the mechanical QWERTY keyboard. Personal computers have been progressively miniaturized, so that presently pocket computers, or "palm top" computers (also referred to as "personal digital assistants") are available which are foldable to fit in the user's pocket. An example is the CASIO PEIA™ personal digital assistant. Operating systems are provided for such palm top computers such as WINDOWS/95 CE™ which allow the user to run applications software designed for personal computers. However in order to fit a keyboard into a palm top computer, the existing solution has been to miniaturze the keys of the keyboard. This makes it impossible for the user to type on the keyboard in the usual way. The screens also are very small.

U.S. Pat. No. 3,940,758, issued Feb. 24, 1976 to Margolin, discloses an expandable keyboard for a pocket calculator, in which the keyboard pad is formed of three modular sections which are hinged together mechanically, normally forming a stack which spreads into an enlarged keyboard. However the enlarged keyboard in Margolin is still considerably smaller than a standard keyboard (the two expansion sections bring 6.5 inches wide, compared to about 11 inches for a standard keyboard), and therefore use of the device for current word processing applications was clearly not contemplated, nor would calculators of that era have had the computing power and software for such uses.

A number of patents disclose hinged extensions to expand the keyboard of a notebook computer. For example, U.S. Pat. No. 5,187,644 issued Feb. 16, 1993 and U.S. Pat. No. 5,519,569 issued May 21, 1996, both to Compaq Computer Corp. disclose portable computers of the notebook variety having extendable end segments which are hinged to the central keyboard. U.S. Pat. No. 5,457,453 issued Oct. 10, 1995 discloses a miniature computer having a folding keyboard, which leaves a jagged edge when folded. However none of these devices provide a full size keyboard for a folding pocket computer.

There is therefore a need for a folding miniaturized computer, to allow the keyboard and screen to fit into a person's pocket, which nonetheless provides a full size keyboard and a useful screen when opened.

DISCLOSURE OF INVENTION

The invention therefore provides a folding computer keyboard, comprising a plurality of keys generally corresponding in spacing, size and location to the keys of a standard personal computer keyboard, and comprising two halves hingedly connected along a fold line, whereby one of the keys is split along the fold line to permit folding of said keyboard.

The invention further provides a folding pocket-sized computer, comprising a screen, a central processing unit, data storage and input means and a computer keyboard comprising a plurality of keys generally corresponding in spacing, size and location to the keys of a standard personal computer keyboard, and comprising two halves hingedly connected along a fold line, whereby one of said keys is split along said fold line to permit folding of said keyboard.

In a further aspect of the invention, the folding computer keyboard comprises a plurality of keys generally corresponding in spacing, size and location to the keys of a standard personal computer keyboard, and comprises two halves hingedly connected along a fold line, whereby a plurality of keys are reversibly movable from a folding position to a typing position. In particular one or more groups of keys are slidable as a unit from a folding position to a typing position.

BRIEF DESCRIPTION OF DRAWINGS

In drawings illustrating a preferred embodiment of the invention, in which the the vertical scale has been exaggerated for ease of illustration:

FIG. 12 is a cross-section taken along line X—X of FIG. 6;

FIG. 13 is a cross-section as shown in FIG. 12, with the computer in the folded configuration;

FIG. 14 is an end elevation of a computer according to the invention in direction E of FIG. 6 in typing configuration; and FIG. 15 is an end elevation of a computer according to the invention in direction E of FIG. 6 in folded configuration.

BEST MODE(S) FOR CARRYING OUT THE INVENTION

Figure 1:
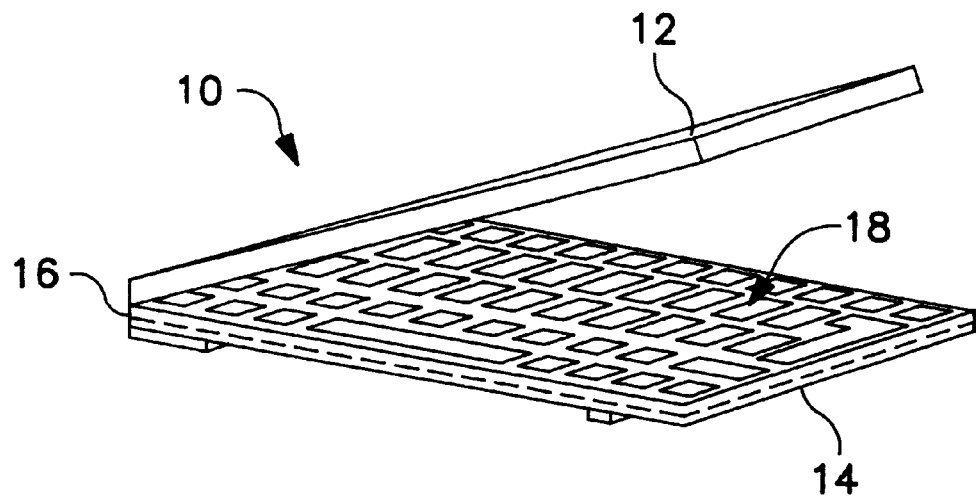
FIG. 1 is a perspective view of a computer according to a first version of a first embodiment of the invention, having a small screen integral with the keyboard, in partially open configuration.
Figure 2:
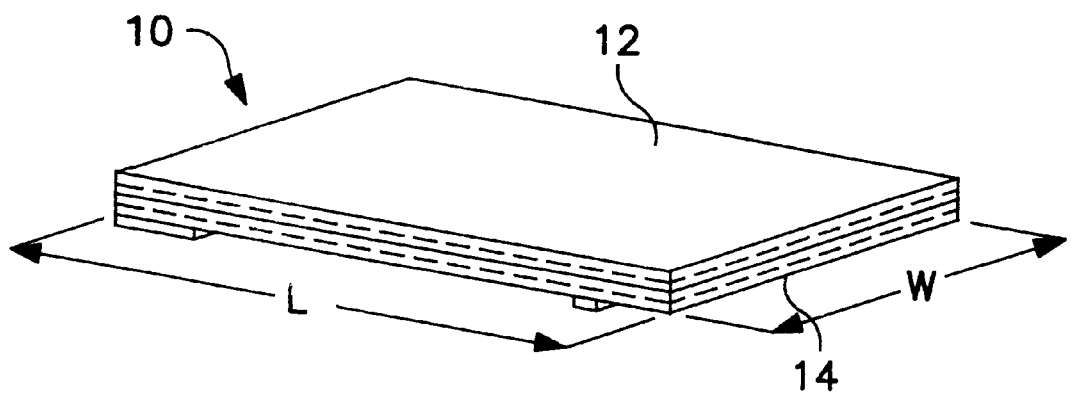
FIG. 2 is a perspective view of a computer according to a the version shown in FIG. 1 in closed configuration.
Figure 3:
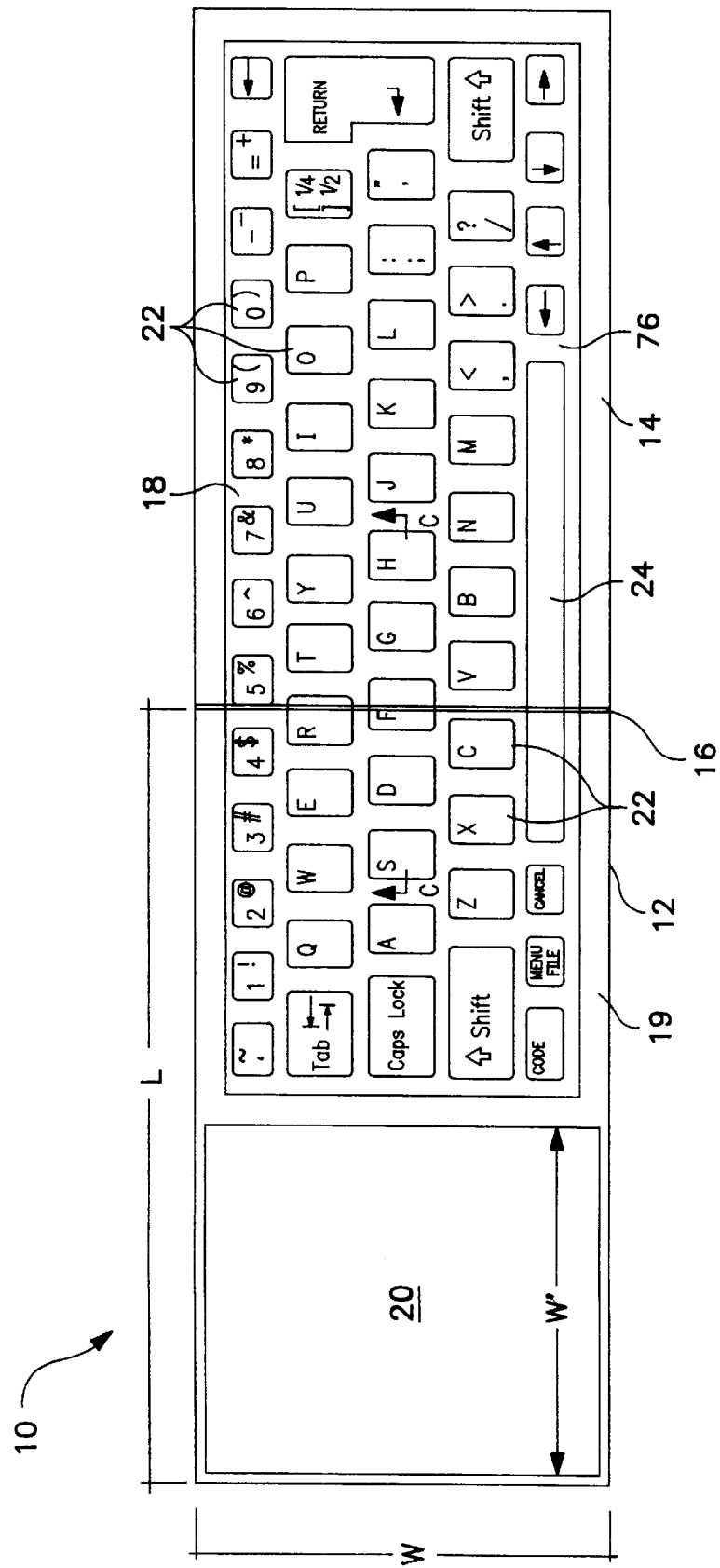
FIG. 3 is a plan view of a computer according to a first version of a first embodiment of the invention, having a small screen integral with the keyboard.

Referring to FIG. 1 through 3 of the drawings, a pocket computer or palm top computer is shown as 10, having a top half 12 and a bottom half 14, hinged at 16 to be foldable from a fully open configuration shown in FIG. 3 to a folded configuration shown in FIG. 2. Computer 10 preferably will be capable of supporting all the applications of a personal computer, such as word processing, spreadsheets, files and folders organization, telephone numbers, addresses, appointment scheduling, access to Internet, etc. Computer 10, for purposes of compactness, need not have a disk drive, power supply or large screen or all the other hardware generally associated with laptop and desktop computers, but still will perform most of the functions of the latter systems, albeit at lesser speeds. Alternatively, the number of functions of the computer can be minimized so as to create a unit which will fiction exclusively as an Internet Access Device equipped with a screen and full size keyboard. The Cost of manufacturing such a device will be a small fraction of the costs of current portable computers having full size keyboards.

According to the invention, the computer 10 has a full-size keyboard 18 in plastic frame 19, and in the first version shown in FIG. 3 has a width W of approximately $3^{29}/_{32}$" and a folded length L of $6^{7}/_{8}$", and in any event narrower than a shirt pocket (about 4") and less than about 7" long. Keys on a standard personal computer keyboard which are redundant for most applications, such as the numeric keypad, and function keys, are removed. As shown in FIG. 3, a screen 20, with a width W of preferably about $2^{25}/_{32}$" is provided on top half 12. In the embodiment shown in FIG. 4, a flip up screen 26 is provided on top half 12 which is pivotable along hinge 28 from a position flat against half 12 to the raised position shown in FIG. 4. Keyboard keys 22 are arrayed on both top half 12 and bottom half 14. In the embodiment shown in FIG. 3, the keyboard 18 folds along fold line 17, which splits the "F" key (or the "H" key as shown in the FIG. 4 embodiment), and the space bar 24. The split "F" (or "H") key has "F" (or "H") keys on each side of the fold line 17, each of which is an effective key. The two sides of the split letter "F" (or "H") will both be active so that the letter "F" (or "H") will be typed whether the left side, right side or the two halves are struck together. Double typing of the letter can be avoided either by program or the keys can be mechanically connected, such as by small male and female connectors, when the unit is in the fully open position.

Figure 4:
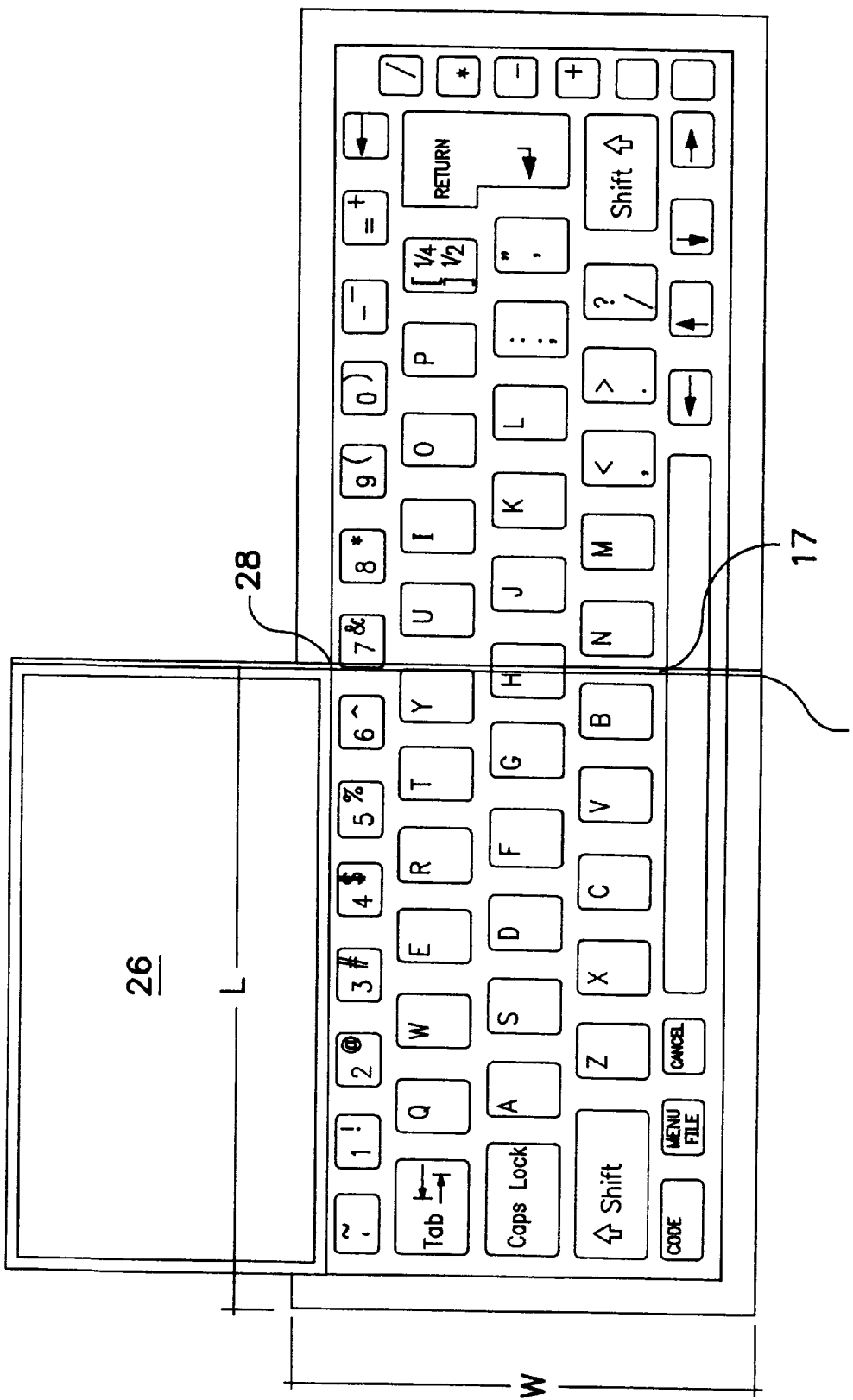
FIG. 4 is a plan view of a computer according to a second version of the first embodiment of the invention, having a "flip up" screen.

In the embodiment shown in FIG. 3, to permit the folding of the keyboard, the "R" and "5" are reduced in size by an amount small enough to have no effect on the typing action. In FIG. 4 because of the different size and consequent changed location of the hinge, the letter "H" will be split in half and the "Y" and "7", will be reduced in size. Keys 22 are very thin compared to standard keyboard keys and project preferably equal to or less ta approximately $^{1}/_{32}$" above the face of the keyboard. A key motion of only $^{1}/_{32}$" is required. The entire keyboard, therefore, is extremely thin, i.e. $^{5}/_{8}$" to $^{3}/_{4}$" thick in dt folded position. The computer will require about $^{1}/_{4}$" additional thickness in the area of the microprocessor and modem. The hinges 16 (shown in more detail in FIG. 7) are located above and below the keyboard, carry the electrical connections and allow the two halves of the keyboard to align together precisely when in the open configuration shown in FIG. 3. Keys 22 have vertical sides and are $^{1}/_{2}$" wide at the top and the bottom to enable the keyboard to be folded with only one key being split (whereas in a standard keyboards the keys are tapered from $^{3}/_{4}$" width at the base to $^{1}/_{2}$" width at the top, finger-contacting surface).

Figure 11:
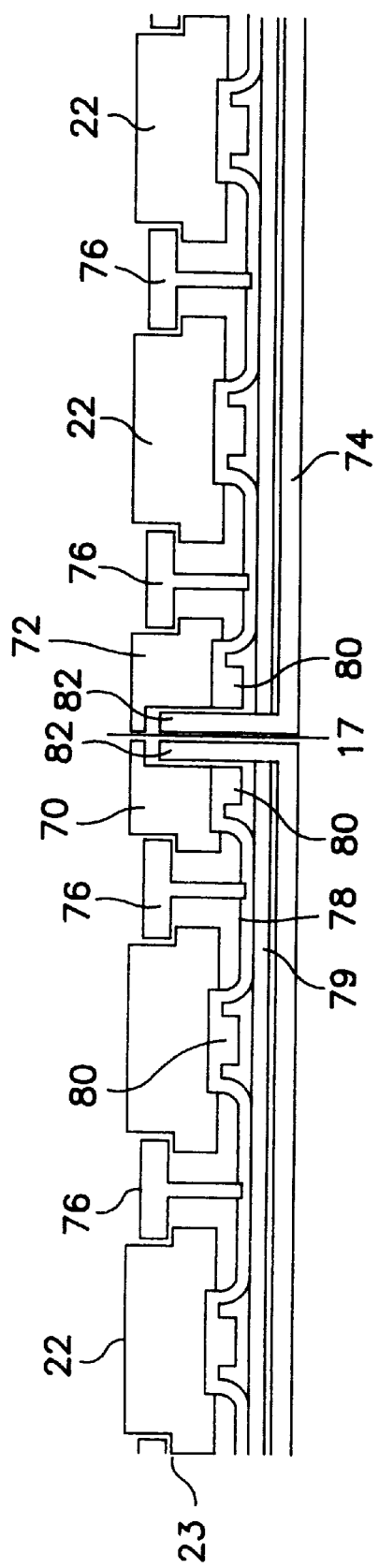
FIG. 11 is a cross-section taken along line C—C of FIG. 3.

The split "F" key is shown in cross-section in FIG. 11, consisting of separate keys 70, 72 on each side of the fold line 17. The keyboard 18 has a plastic base 74, and a moulded plastic keyboard top 76 which retains the keys 22 and through openings in which the keys protrude. As in existing electronic keyboards, a flexible matt 78 is provided under the top 76 on which keys 22 sit and which biases keys 22 upwardly so that the shoulders 23 of keys 22 are pressed against the underside of top 76 when not depressed by the user. A printed circuit board 79 is provided between base 74 and mat 78. An electrical contact 80 is provided on the underside of mat 78 under each key 22, so that when the key 22 is depressed, the appropriate electrical circuit is completed in circuit board 79 to signal to the microprocessor that the key has been depressed. Key halves 70, 72 function similarly and are guided in vertical movement by upstanding extensions 82 of base 74.

Figure 5:
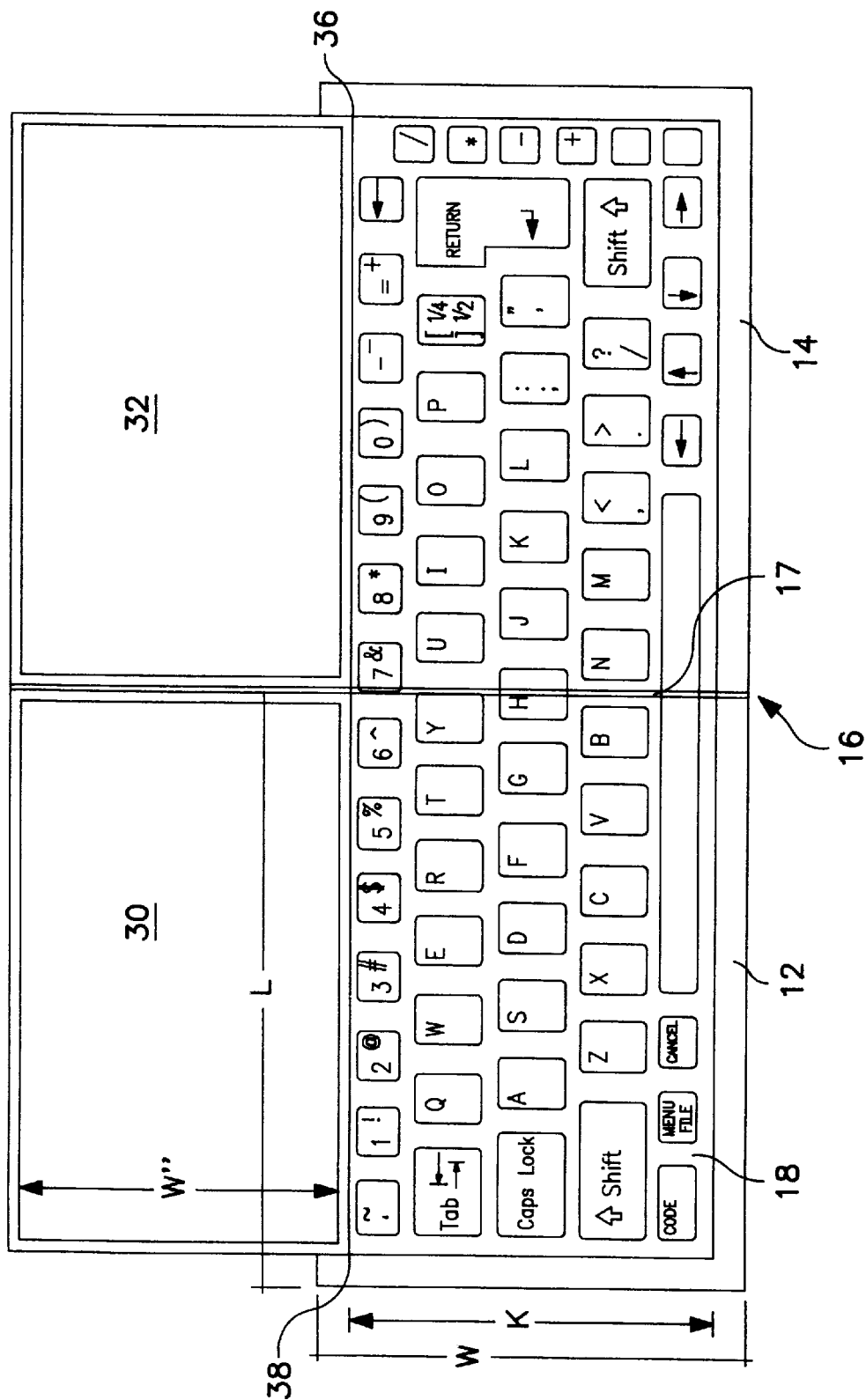
FIG. 5 is a plan view of a computer according to a third version of the first embodiment of the invention, having two "flip up" screens.

In the embodiment shown in FIG. 5, two flip up screens 30, 32 are provided on halves 12, 14 which are pivotable along hinges 36, 38 from a position flat against halves 12, 14 to the raised position shown in FIG. 5. The embodiment shown in FIG. 5 can be constructed with a screen similar to that in FIG. 6 with no center frame, but rather abutting screen edges, to improve the continuity of the screen. In the embodiment shown in FIG. 6, there are four flip up screens 40, 42, 44, 46 provided on top halves 12, 14 which are pivotable along hinges 47, 48, 50, 51 from a position flat against halves 12, 14 to the raised position shown in FIG. 6.

Figure 6:
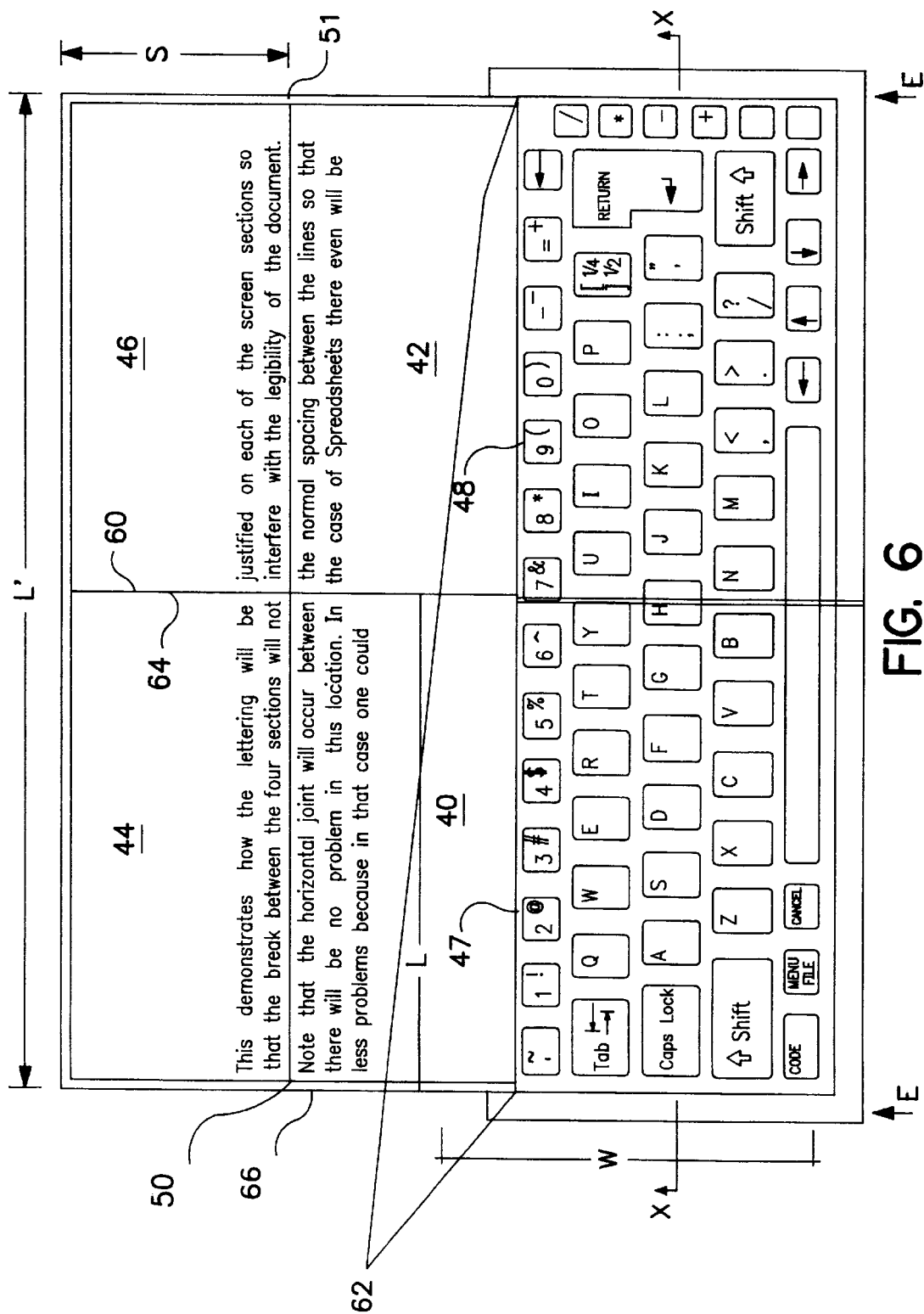
FIG. 6 is a plan view of a keyboard according to a fourth embodiment of the invention, having two "flip up" screens, each screen folding into two screens making one large screen divided into four equal segments.

In the embodiments of FIG. 4 and 5, the computer 10 has a width W of approximately $3^{29}/_{32}$" and a folded length L of $5^{3}/_{4}$". In the embodiment shown in FIG. 6, a slightly larger total unfolded length of $11^{17}/_{32}$" may be required. It will be apparent to those skilled in the art that the Mess of the folded computer shown in FIG. 4, 5 and 6 is necessarily greater than the FIG. 3 embodiment due to the added thickness of the liquid crystal screen, which is a liquid crystal film sandwiched between two pieces of structural glass or high impact plastic with a thickness of about $^{3}/_{64}$". Four such screens, as in the FIG. 6 embodiment, will total a thickness of about $^{3}/_{16}$". Screens 30 in FIG. 5 have a width W" of preferably $3^{1}/_{4}$" and the keyboard 18 has a width K of about $3^{9}/_{32}$".

The embodiment shown in FIG. 6 is particularly suitable for applications such as EXCEL™ which require four screen sections. Further, it can be constructed so that the lettering is justified on each of the screen sections so that the break between the four sections will not interfere with the legibility of the documents, as shown in FIG. 6. Screens 44, 40 are hinged at joint 50, along the rear surface thereof by thin joints, as are screens 46, 42 at joint 51. However screen units 44, 40 and 46, 42 separate along edges 60, 64 by sliding outwardly a short distance ($^{1}/_{16}$") at locations 62 to permit the folding of the computer, and slide back so that edges 60, 64 abut as shown in FIG. 6 in the open configuration. The screen can be lit by light sources along the exterior frame 66. The combined lengths L' of the two screen halves 44, 46 is preferably $10^{25}/_{32}$" and each screen section has a preferred width S of $3^{1}/_{4}$" for a preferred diagonal dimension of $12^{13}/_{32}$".

The embodiment of the invention shown In FIG. 6 is shown in cross-section in FIG. 12, with screens 44, 40, 42 and 46 folded flat against the keyboard, and edges 60, 64 separated for folding. Four legs 102 are folded down for typing position. In the folded position shown in FIG. 13, a snap-on plastic end cap 104 can be provided to protect the exposed end of the screens and split keys of the computer, and to keep out dust and remain secure in the folded position. The total folded thickness is 3/4", 3/8" for each computer half 12, 14, each half comprising 1/4" in thickness for the computer body, plus 1/32" for the key travel, plus two screen sections being a total of 3/32". The end view of the open and folded computer is shown in FIG. 14, 15. Compartment 100 is provided to house the modem, batteries, power connection, computer connections and the like.

Figure 7:
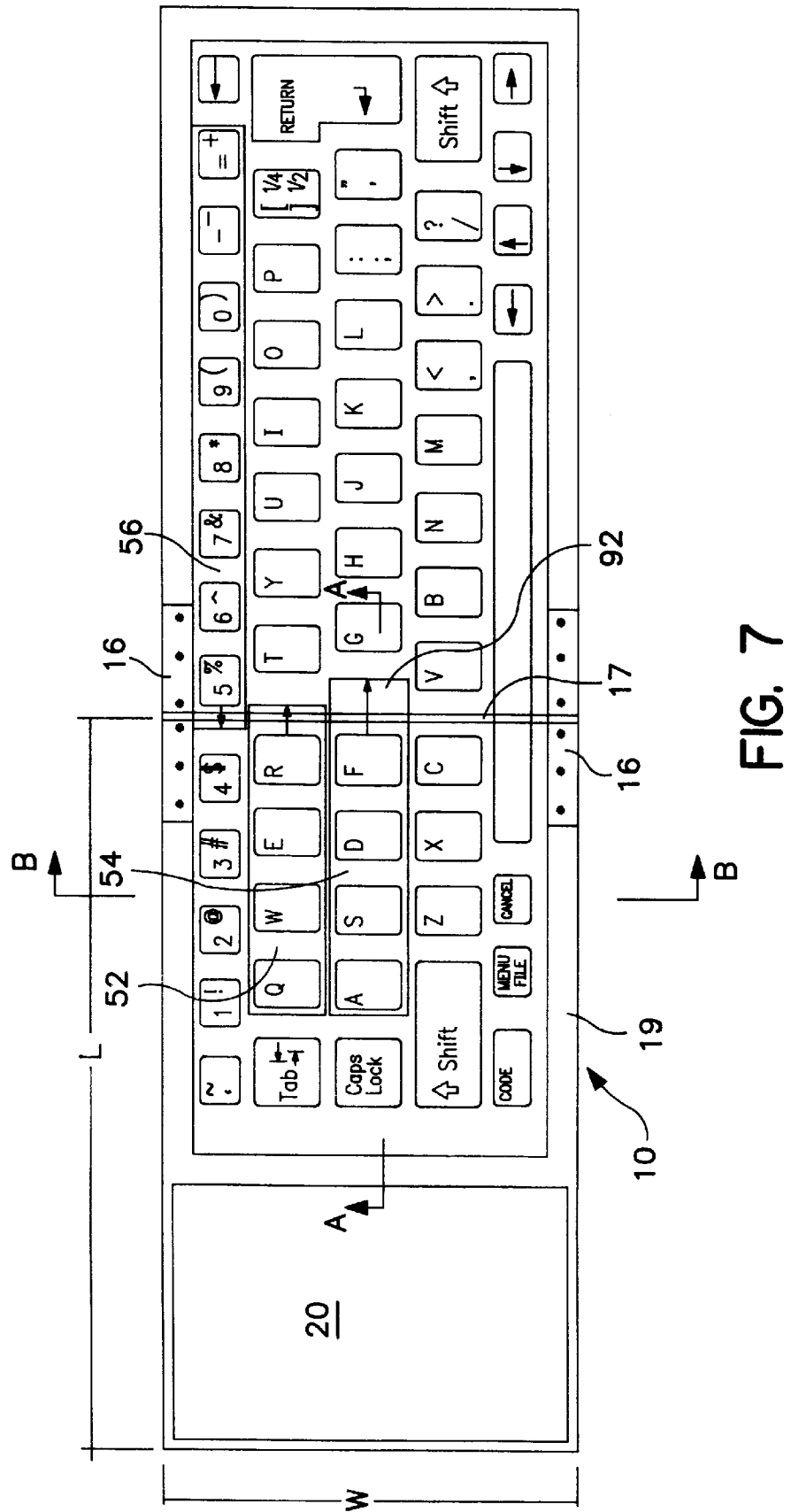
FIG. 7 is a plan view of a computer according to a second embodiment of the invention, having a small screen integral with the keyboard, showing the keys in folding configuration.
Figure 8:
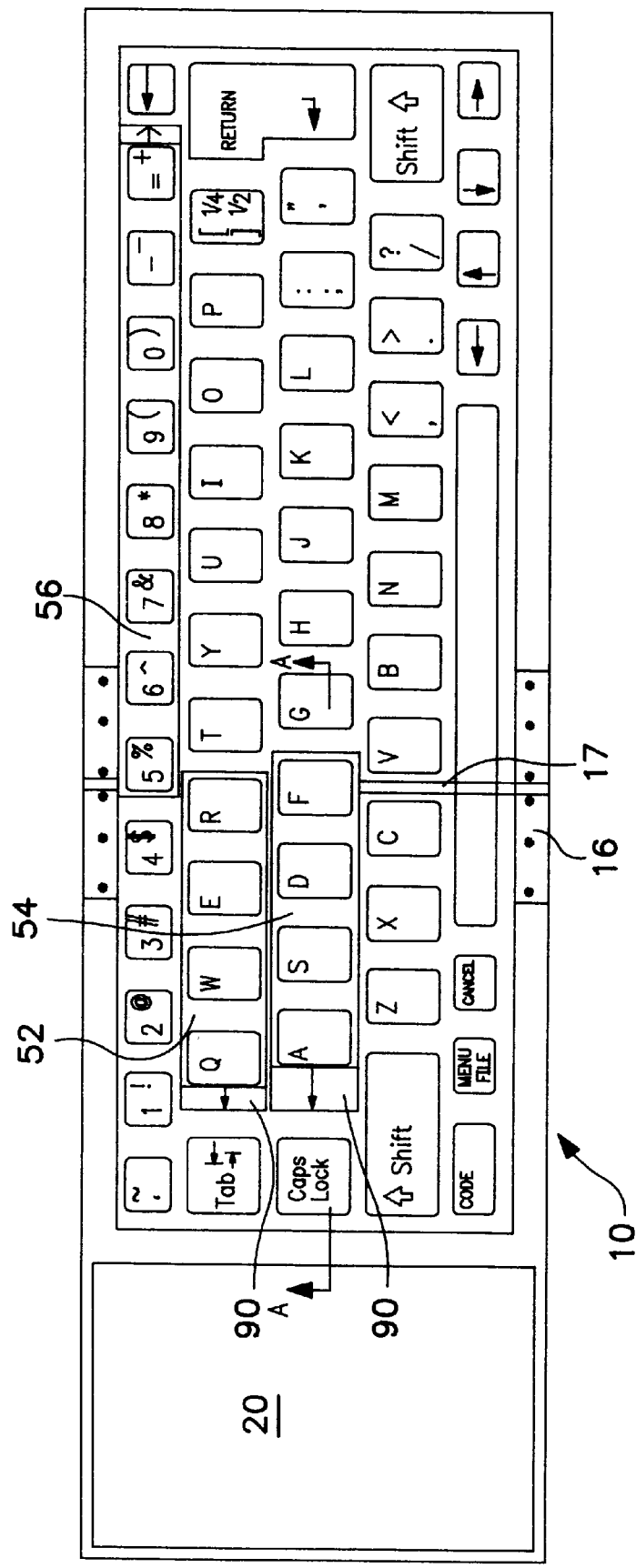
FIG. 8 is a plan view of the embodiment of the computer shown in FIG. 7 showing the keys in typing configuration.

In the further embodiment illustrated in FIG. 7, 8 and 9, rather than splitting keys to permit a folding keyboard, the groups of letters "QWERTY", "ASDFGH" and "7890-=" are movable on carriages 52, 54, 56 and slide from a folding position shown in FIG. 7 to a typing position shown in FIG. 8. In the typing position, the carriages 52, 54, 56 carrying the groups of letters will be locked into the normal keyboard locations. In order to re-fold the keyboard, the carriages 52, 54, 56 are moved to the position shown in FIG. 7 and locked in that position. The "Tab", "Caps Lock" and " " keys may be extendible to fill in the gaps created by the sliding into the "Typing Position". In the FIG. 7 embodiment, the computer 10 has a width W of approximately 3 29/32" and a folded length L of 6 7/8" as in the FIG. 3 embodiment.

Figure 9A:
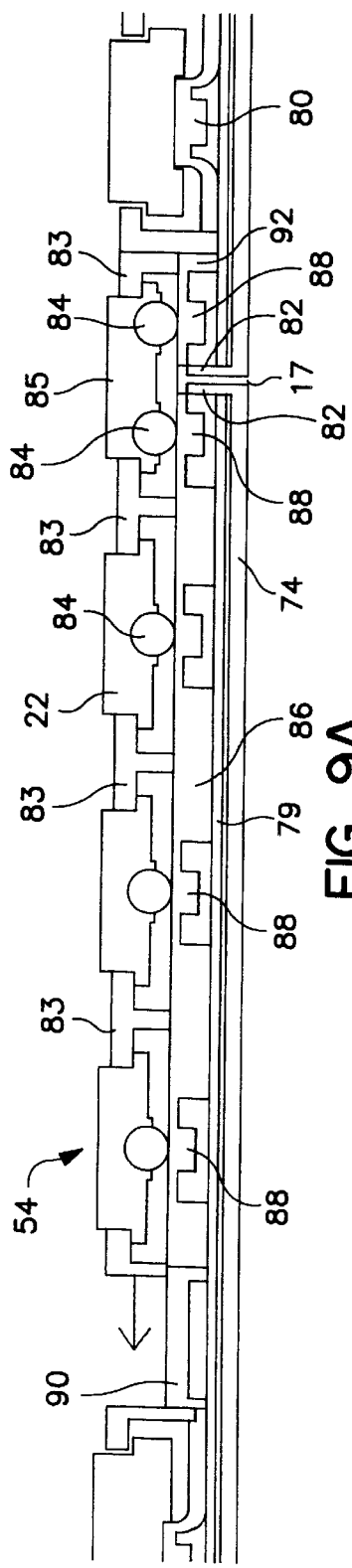
FIG. 9A is a cross-section taken along line A—A of FIG. 8 showing the keys in typing configuration.
Figure 9B:
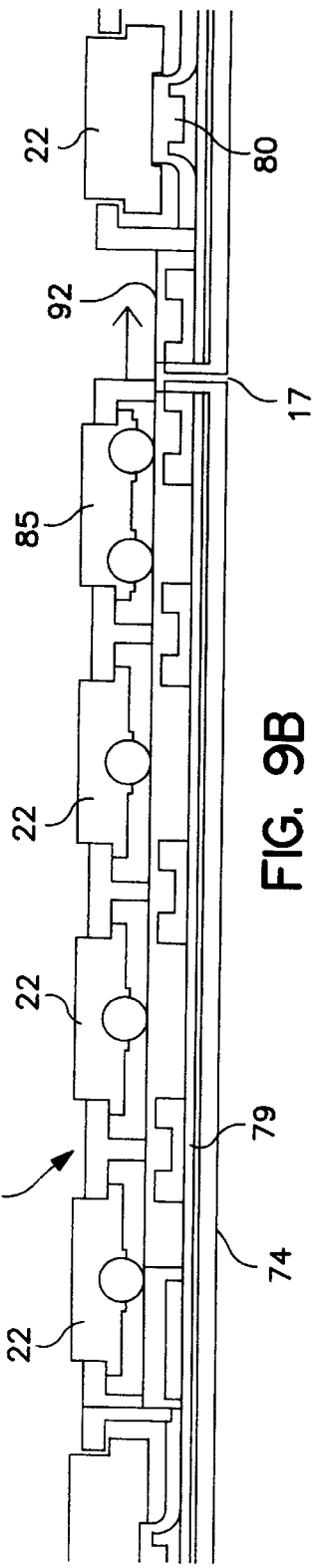
FIG. 9B is a cross-section taken along line A—A of FIG. 7 showing the keys in folding configuration.
Figure 10:
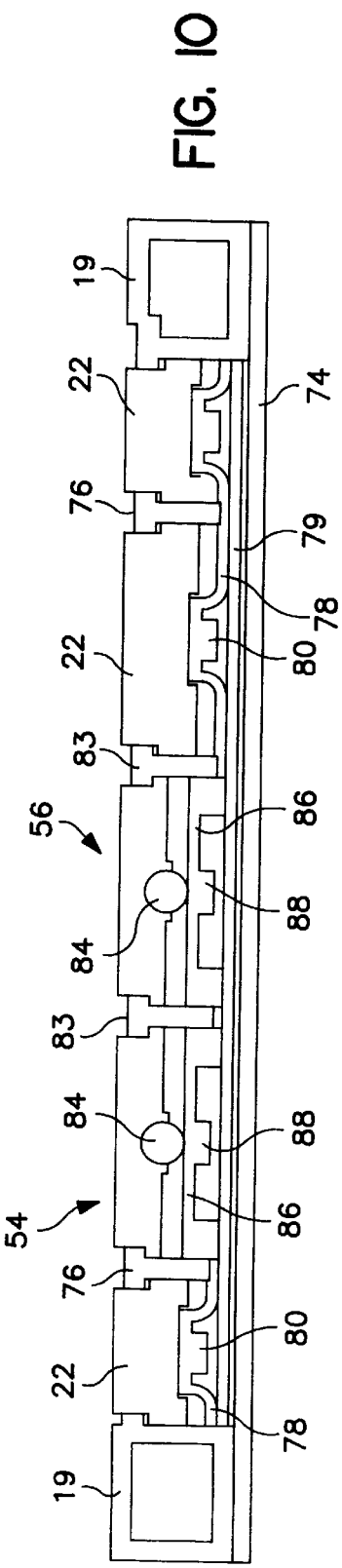
FIG. 10 is a cross-section taken along line B—B of FIG. 7.

Carriage 54 is shown in cross-section in FIG. 9A and 9B. keys 22 are provided with a plastic roller 84, and are retained by plastic top 83. Flexible mat 86, 92 is flat to permit rolling or sliding of carriage 54, and again carries on its underside electrical contacts 88 which form a circuit with circuit board 79 when keys 22, when in the typing position shown in FIG. 9A, are depressed, Plastic infill pieces 90, 92 form a surface on which the carriage 54 can slide or roll. The "F" key 85 has two rollers 84 to contact separate electrical contacts 88. In FIG. 9a the carriage 54 is in typing position, whereas in FIG. 9b the carriage 54 has been moved to the folding position to permit folding along line 17.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A folding computer keyboard, comprising a plurality of keys arranged in a plurality of rows extending in a lengthwise direction, said keys generally corresponding in spacing, size and location to the keys of a standard personal computer keyboard, and comprising two halves hingedly connected along a fold line extending generally perpendicularly to the direction of said rows of keys, wherein one of said keys is split into two portions, one on each side of said fold line to permit folding of said keyboard, said split key being able to provide same function when either portion or both portions are simultaneously struck.

2. The folding computer keyboard of claim 1 wherein a second of said keys is reduced in side to permit folding of said keyboard.

3. The folding computer keyboard of claim 1 wherein a second and third of said keys are reduced in size to permit folding of said keyboard.

4. The folding computer keyboard of claim 1 wherein said keys have a vertical travel distance equal to or less than 1/32".

5. The folding computer keyboard of claim 1 wherein said split key portions are mechanically connected when said folding keyboard is unfolded and unconnected when said folding keyboard is folded.

6. The folding computer keyboard of claim 1 wherein said split key portions each are active.

7. A folding pocket-sized computer, comprising a screen, a central processing unit, data storage and input means and a computer keyboard comprising a plurality of keys arranged in a plurality of rows extending in a lengthwise direction, said keys generally corresponding in spacing, size and location to the keys of a standard personal computer keyboard, and comprising two halves hingedly connected along a fold line extending generally perpendicularly to the direction of said rows of keys, wherein one of said keys is split into two portions, one on each side of said fold line to permit folding of said keyboard, said split key being able to provide same function when either portion or both portions are simultaneously struck.

8. The folding pocket-sized computer of claim 7 wherein said split key portions each are active and said computer is programmed to avoid double typing by said split key portions.

9. The folding pocket-sized computer of claim 7 wherein said split key portions are mechanically connected when said folding keyboard is unfolded and unconnected when said folding keyboard is folded.

10. The folding pocket-sized computer of claim 7, having dimensions when folded less than 4"×7".

11. The folding pocket-sized computer of claim 7, wherein said screen comprises a screen section pivotally connected to one of said keyboard sections.

12. The folding pocket-sized computer of claim 11, wherein said screen comprises two screen sections, each pivotally connected to one of said keyboard sections.

13. The folding pocket-sized computer of claim 11, wherein said screen comprises four screen sections, a first and a second screen section each pivotally connected to one of said keyboard sections and a third and a fourth screen section each pivotally connected to one of said first and second screen sections.

14. The folding pocket-sized computer of claim 11 wherein the number of functions of the computer is minimized so as to create a unit which will function exclusively as an Internet Access Device.

* * * * *